United States Patent
Zawischa et al.

(10) Patent No.: US 10,591,803 B2
(45) Date of Patent: Mar. 17, 2020

(54) VARIABLE-ASTIGMATISM BEAM ADAPTATION DEVICE AND FREQUENCY CONVERSION UNITS

(71) Applicant: TRUMPF LASER GMBH, Schramberg (DE)

(72) Inventors: Ivo Zawischa, Gundelfingen (DE); Markus Graf, St. Goergen (DE); Carolin Wagner, Villingen-Schwenningen (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 16/223,486

(22) Filed: Dec. 18, 2018

(65) Prior Publication Data

US 2019/0129277 A1 May 2, 2019

Related U.S. Application Data

(63) Continuation of application No. PCT/EP2017/065438, filed on Jun. 22, 2017.

(30) Foreign Application Priority Data

Jun. 29, 2016 (DE) .................. 10 2016 111 932

(51) Int. Cl.
*G02F 1/35* (2006.01)
*G02B 27/09* (2006.01)
(Continued)

(52) U.S. Cl.
CPC ........ *G02F 1/3532* (2013.01); *G02B 27/0911* (2013.01); *G02F 1/353* (2013.01);
(Continued)

(58) Field of Classification Search
CPC ........... G02F 2001/3503; G02F 1/3532; G02B 26/002
See application file for complete search history.

(56) References Cited

U.S. PATENT DOCUMENTS

| 5,745,296 A | 4/1998 | Nakamura et al. |
| 6,043,843 A * | 3/2000 | Kelley .................. G02B 26/00 348/207.99 |

(Continued)

FOREIGN PATENT DOCUMENTS

| DE | 60120905 | 2/2007 |
| DE | 102010003591 | 10/2011 |

(Continued)

OTHER PUBLICATIONS

German Office Action in Application No. 102016111932.6, dated Feb. 15, 2017, 7 pages (with English translation).
(Continued)

*Primary Examiner* — Rhonda S Peace
(74) *Attorney, Agent, or Firm* — Fish & Richardson P.C.

(57) ABSTRACT

Beam adaptation devices are disclosed for variable-astigmatic adjustment of electromagnetic radiation propagating along a beam axis of the beam adaptation device. The devices include a first astigmatism lens unit, which provides at least one first lens tiltable with respect to the beam axis for astigmatism adjustment, a divergence matching lens unit with a second lens for adjusting the divergence, wherein the distance between the second lens and the first lens along the beam axis is adjustable, and a second astigmatism lens unit with at least one third lens tiltable with respect to the beam axis for astigmatism adjustment. To adjust the magnitude of the electromagnetic radiation on the third lens, the distance between the second lens and the third lens along the beam axis is adjustable. The beam adaptation device can be used, (Continued)

for example, for astigmatic pre-compensation in frequency conversion.

20 Claims, 6 Drawing Sheets

(51) Int. Cl.
  *G02F 1/355* (2006.01)
  *G02F 1/377* (2006.01)
(52) U.S. Cl.
  CPC .......... *G02F 1/3544* (2013.01); *G02F 1/3551* (2013.01); *G02F 1/377* (2013.01); *G02F 2001/3503* (2013.01); *G02F 2001/354* (2013.01)

(56) References Cited

U.S. PATENT DOCUMENTS

| | | |
|---|---|---|
| 6,426,840 B1 | 7/2002 | Partanen et al. |
| 8,422,119 B1 | 4/2013 | Keaton et al. |
| 2004/0228372 A1 | 11/2004 | Vodopyanov et al. |
| 2009/0071947 A1* | 3/2009 | Sekiguchi .......... B23K 26/0617 219/121.75 |
| 2009/0257118 A1 | 10/2009 | Heritier et al. |
| 2010/0103803 A1* | 4/2010 | Yamasaki ............ G11B 7/1275 369/112.24 |
| 2012/0032065 A1 | 2/2012 | Armstrong |
| 2012/0120481 A1 | 5/2012 | Armstrong |
| 2015/0355447 A1* | 12/2015 | Dam .................. G02B 21/0004 359/326 |

FOREIGN PATENT DOCUMENTS

| | | |
|---|---|---|
| EP | 1237034 | 9/2002 |
| WO | WO 2011/120777 | 10/2011 |

OTHER PUBLICATIONS

International Preliminary Report on Patentability in International Application No. PCT/EP2017/065438, dated Jan. 10, 2019, 15 pages (with English translation).

International Search Report and Written Opinion in International Application No. PCT/EP2017/065438, dated Sep. 21, 2017, 16 pages (with English translation).

* cited by examiner

VARIABLE-ASTIGMATISM BEAM ADAPTATION DEVICE AND FREQUENCY CONVERSION UNITS

CROSS REFERENCE TO RELATED APPLICATIONS

This application is a continuation of and claims priority under 35 U.S.C. § 120 from PCT Application No. PCT/EP2017/065438 filed on Jun. 22, 2017, which claims priority from German Application No. 10 2016 111 932.6, filed on Jun. 29, 2016. The entire contents of each of these priority applications are incorporated herein by reference.

TECHNICAL FIELD

The present invention relates to a beam adapter, in particular for continuously variable adaptation of a laser beam with respect to beam parameters such as lateral extent and divergence, especially for influencing astigmatism and non-rotationally symmetrical beam cross-sections. Furthermore, the invention relates to a frequency conversion unit and a frequency conversion method.

BACKGROUND

In complex optical systems, laser beams can have different input parameters that are to be adapted to narrow output specifications. Specific input parameters of a laser beam, which is to be coupled into an optical system, result from the characteristics of the individual beam sources or of the beam sources in combination with beam guides or further optics placed in the beam, for example. These characteristics differ, for example, from laser type to laser type, from product series to product series, from system (installation) to system. However, as complex optical systems (such as beam sources or beam guides) can rarely be built or operated identically without tolerance, differing characteristics can also arise between individual units of a product series planned as identical units, e.g., from not completely identical or imperfect individuals of beam sources or beam guides. Specific output parameters may arise from special optical requirements and an optical process to be performed by the optical system that receives the laser beam. Analogous to the input parameters, the required output parameters can be different and vary individually. However, output parameters often lie within very narrow tolerances due to the application or the subsequent optics to enable precise laser applications or processes repeatable in an exact manner.

Herein, it is referred to a lateral beam dimension and a divergence of a beam. Essentially, this refers to the second moments of the field or intensity distributions as defined in the standards ISO 13694, ISO 11145 and ISO 11146. However, other appropriate definitions may also be used.

Often one needs to adjust the lateral extent of a laser beam and its divergence in several axes in different ways between beam source, beam guide, and application system. Many systems receiving such a beam require a particularly rotationally symmetrical beam, which the beam sources or the optical systems preceding the receiving system cannot provide with the required accuracy. In some receiving systems, however, a precisely defined non-rotational symmetric form, e.g., elliptical form, astigmatic form, or both of the laser beam is also a target of the adaptation. In general, US 2009/0257118 A1 shows a telescope arrangement for beam shaping which has no variability with regard to beam adaptation due to the pre-selected mirrors, for example.

When, e.g., ultraviolet (UV) laser radiation is generated by non-linear frequency conversion, undesired aberrations in the amplitude and phase of the UV laser radiation can occur within a frequency conversion unit. Such aberrations are compensated, e.g., by optical systems being positioned downstream and designed for correction, see, e.g., US 2012/0120481 A1 and US 2004/0228372 A1. However, optical components of such optical correction systems can experience a gradual influence of the surface, in particular of a surface coating, by the UV laser radiation, which can be detrimental to the function of the overall system.

Furthermore, DE 10 2010 003591 A1 discloses a frequency conversion set-up to compensate for a difference in the propagation directions in a non-linear crystal. Therein, a beam offset of two input beams is effected by passing a lens with a relatively small offset relative to the beam axis, with a tilt, or both. As only a minor beam offset is required, an excessively strong ellipticity of the incident laser beams is avoided. Furthermore, U.S. Pat. No. 8,422,119 B1 discloses a combination of a non-linear crystal for frequency conversion and a cylindrical lens arranged in front of the non-linear crystal to produce a specific beam shape in the non-linear crystal.

In addition, EP 1 237 034 B1 discloses an optical system with electronic spot size control and focus control, US 2012/0032065 A1 discloses a dynamic wavefront control of a frequency-converted laser system, and U.S. Pat. No. 5,745,296 discloses a multi-beam writing device.

SUMMARY

This disclosure provides variable astigmatic beam adapters. In another aspect, this disclosure provides an output beam of a frequency conversion unit, in particular a UV output beam, with a rotationally symmetrical extent, divergence, or both.

In a first aspect, the disclosure provides beam adaptation devices for variably adjusting astigmatism and/or adjusting the lateral extent of electromagnetic radiation propagating along a beam axis of the beam adaptation device. The devices include a first astigmatism lens unit for receiving the electromagnetic radiation, which provides at least one first lens arranged to be tilted with respect to the beam axis for adjusting astigmatism, a divergence matching lens unit having a second lens arranged to adjust the divergence, whereby the distance between the second lens and the first lens of the first astigmatism lens unit is adjustable along the beam axis, and a second astigmatism lens unit having at least one third lens, which is arranged to tilt relative to the beam axis for adjusting astigmatism. Thereby, the distance between the second lens and the third lens of the second astigmatism lens unit along the beam axis is adjustable, in particular for adjusting the size of the electromagnetic radiation on the third lens.

In another aspect, the disclosure provides frequency conversion units that include a beam pre-compensation device having a beam adaptation device as described herein for shaping electromagnetic radiation provided by a beam source into an output beam having predetermined beam parameters, and a frequency conversion device having a frequency conversion crystal for generating a frequency-converted beam with the output beam. The frequency conversion device is configured to generate the frequency-converted beam to have an asymmetric beam deformation regarding one or both of beam shape and divergence with respect to the output beam.

In another aspect, an optical system has a plurality of optical components influencing one or both of beam shape and divergence in the optical system and a beam adaptation device as described above for compensating one or both of beam shape and divergence in the optical system. Thereby, the compensation is performed in particular after adjustment, replacement of one of the optical components, for setting certain parameters of a beam generated by the optical system.

In another aspect, frequency conversion methods include: providing electromagnetic radiation propagating along a propagation direction, adapting the electromagnetic radiation with a beam adaptation device as described above with respect to beam size and divergence to form an output beam for frequency conversion in a frequency conversion crystal, and generating a frequency-converted beam in the frequency conversion crystal. The adaptation with respect to beam size and divergence of the output beam is performed such that the desired beam parameters of the frequency-converted beam are given.

In some embodiments, one or more of the first astigmatism lens unit, the divergence matching lens unit, and the second astigmatism lens unit are configured such that due to the tiltability of one or both of the first lens and the third lens and the displaceability of the divergence matching lens unit, the size of the electromagnetic radiation at the second astigmatism lens unit and the divergence of the electromagnetic radiation in each of two independent directions downstream of the second astigmatism lens unit can be set by tilting and displacing the corresponding lenses. For example, the directions (main axes) of the beam extent (at a reference plane) can be set independently of the directions (main axes) of the divergence. The two main axes of the beam extent are typically perpendicular to each other, as are the two main axes of the divergence.

In some embodiments, one or more of the first astigmatism lens unit, the divergence matching lens unit, and the second astigmatism lens unit are configured such that the tiltability and the displaceability of the first lens, the third lens, or both, and the displaceability of the divergence matching lens unit make it possible to freely adjust the size and the divergence of the electromagnetic radiation beam downstream of the beam adapter in directions independent of one another in a manner not rotationally symmetric to the optical axis; i.e., the main axes of the beam extent (at a reference plane) and the main axes of the divergence can be selected independently in their orientation and size.

In some embodiments, the beam adaptation device further includes an adjustment rail formed along the beam axis for positioning one or more of the first astigmatism lens unit, the second astigmatism lens unit, and the divergence matching lens unit along the beam axis. In addition or alternatively, the beam adaptation device may further include at least one rotation holder for holding the first lens or the third lens, the at least one rotation holder including at least one adjusting device for adjusting at least one tilt angle of the corresponding lens about at least one tilt axis. In particular, a tilt axis can extend orthogonal to the beam axis.

In some embodiments, the beam adaptation device further includes a beam analysis unit having a first detection unit for recording a beam profile of the electromagnetic radiation in an image plane, and an analysis lens, which maps the beam profile, in particular the third lens as object plane, onto the image plane in the region of the second astigmatism lens unit. Furthermore, the beam analyzer unit may have at least one far field detection unit for recording a beam profile of the electromagnetic radiation in a far field plane after the second astigmatism lens unit. The beam analysis unit is configured in particular for analyzing an analysis portion of the electromagnetic radiation.

In some embodiments, the beam adaptation device further includes a control unit for controlling the tilting of one or both of the first lens and the third lens, a control unit for controlling at least one of the distances between the divergence matching lens unit and the astigmatism lens units, or both control units. In particular, the control can be performed depending on the beam profiles detected by the beam analysis unit and in particular depending on one or both of specified target beam profiles and the measuring parameters hearkening from the beam.

An advantage of the concepts described herein is the simplicity of the optical set-up, with which the task of setting a beam parameter can be solved. The beam adaptation device can thus be advantageously set up with a few spherical lenses that are easy to manufacture. A further advantage lies in the comparatively high tolerance of the beam adaptation device against misalignment and in the very flexible use of the beam adaptation device. As the astigmatism of the tilted lenses increases slowly and continuously with the tilt angle, there may also be a high tolerance in the angles to be set.

The concepts described herein can thus help to specify more closely the divergence and the beam diameter, especially for free-beam guided ultrashort pulse (USP) lasers. The relative insensitivity to misalignment when using spherical lenses compared to using cylindrical lenses can also make it easier for the user to put the beam adaptation device into operation, e.g., even after a lengthy transport.

The concepts described herein relate in particular to the beam shaping of pump laser radiation, seed laser radiation, or both for frequency conversion, in particular for UV radiation generation, as well as the flexible setting of beam parameters in general.

Herein, concepts are disclosed that allow to at least partly improve aspects of the prior art. In particular, additional features and their usefulness result from the following description of embodiments on the basis of the drawings.

DETAILED DESCRIPTION

Figure 1A:
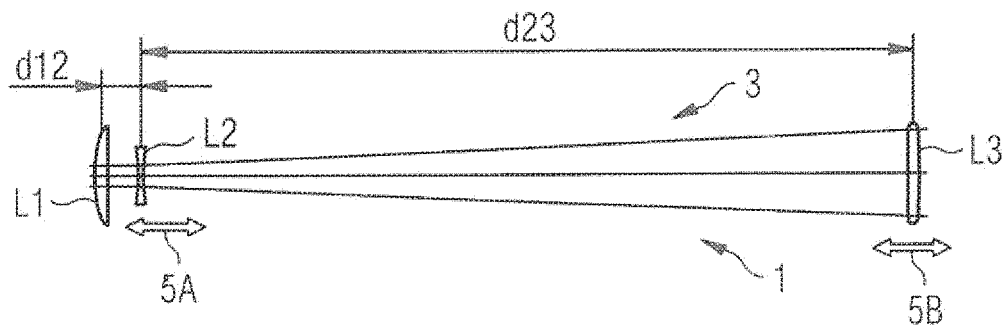
FIGS. 1A to 1C show schematic illustrations of an example of variable beam expander for divergence setting as described herein.

The aspects described herein are partly based on the realization that a system for variable beam expansion and beam parameter adjustment, which includes several lenses movable along the beam axis (e.g., a converging lens, a diverging lens, and a converging lens) can be supplemented by degrees of freedom for tilting and possibly degrees of freedom of transversal translation with regard to one or more lenses. This allows both the size and divergence of the beam at the exit of the system to be freely influenced in different axes (transversal to the direction of propagation).

As mentioned above, various applications of laser systems, e.g., in material processing, require beam parameters that are specific and partially have narrow tolerances. These beam parameters can be provided, for example, on a specific optical element or on a workpiece to be machined. The beam parameters include, for example, a focus diameter, a roundness or an ellipticity of the beam in the focus or near the focus, and the axial position of the focus (in the direction of propagation of the laser beam). Optical elements, which may require beam parameters for specific applications, include diffractive optical elements (DOEs) and frequency conversion crystals. The transport of the laser light to the application can also place special requirements on the required input beam parameters (e.g., for transport fibers or cutting optics of laser-based machine tools).

However, a laser beam source or propagated laser radiation rarely corresponds directly to the needed requirements. In addition, beam sources, even if of the same design, often have slightly different beam parameters. For example, used optical elements can deviate from the ideal or thermal or other physical effects can deform the beam differently. Accordingly, readjustment may become necessary depending on the beam source used, for example, when replacing a beam source. The discrepancies between the electromagnetic radiation provided by the beam source and the parameters needed for the application include, for example, in a deviation of the beam diameter (at a reference point) and the beam divergence. These deviations can be rotationally symmetrical. However, different sizes can also be required or adapted in different axes; i.e., a specific non-circular or generally astigmatic beam can be present or required.

It should be noted that laser processing requirements for the laser beam are often so narrow for beam parameters that extreme requirements are placed on the components of the laser system or the beam guide. For example, astigmatism is easily and often caused by plane deflectors, which have a small (but not always identical) curvature due to production or mounting. For precise laser material processing, an astigmatic beam is usually not acceptable.

The beam adaptation devices disclosed herein allow the beam of a beam source to be adapted to the requirements of the application or of the transport to the application. Spreading in the beam parameters can be compensated by varying the size and divergence of the incident beam in different axes. With the beam adaptation device disclosed herein, the change in all degrees of freedom can be performed continuously and even small deviations can be adjusted without the need for a stage.

Extended by a beam analysis unit, the beam adaptation device disclosed herein can also be used to characterize the output beam or specifically to adapt the output beam to required beam parameters.

In general, the beam adaptation devices disclosed herein combine the principle of a variable beam expander (telescope), which includes several lenses, with that of the tilted lens. By selecting the lenses and their distances, the general (rotationally symmetrical) influence of the beam size and divergence can be selected. By tilting a single element or multiple elements around several axes or a freely selected axis, the symmetry can be broken in a controlled manner, and the size of the beam in a reference plane and the divergence in freely selectable axes can be influenced differently. A generally adjustable astigmatism can thus be generated or an existing astigmatism can be compensated accordingly.

In the following, the effects of adapting divergence (in connection with FIGS. 1A to 1C) and of generation astigmatism by tilting lenses (in connection with FIG. 2), which are fundamental for the beam adaptation device, are explained. In connection with FIGS. 3 and 4, an exemplary implementation and an exemplary beam analysis unit are then described. Finally, the use of a beam adaptation device in the context of a frequency conversion and its integration into a system generating UV laser radiation is described in connection with FIGS. 5 and 6.

FIG. 1A shows a classical variable beam expander 1 including three lenses (or lens units): a first converging lens L1, a diverging lens L2, and a second converging lens L3. The beam expander 1 represents an exemplary basic set-up of the beam adaptation device disclosed herein. The function can be described as follows. The first two lenses L1, L2 form, depending on their focal lengths f1, f2 and their distance d12, an element of variable focal length. With the element of variable focal length, the divergence in a beam section 3 behind the two lenses L1, L2 and in front of the second converging lens L3 can be changed. As indicated in FIG. 1A, the beam propagates to the third lens L3 at a distance d23 from the second lens, changing its size according to the set divergence.

Figure 1B:
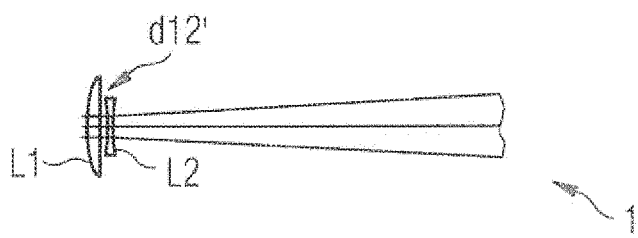
Figure 1C:
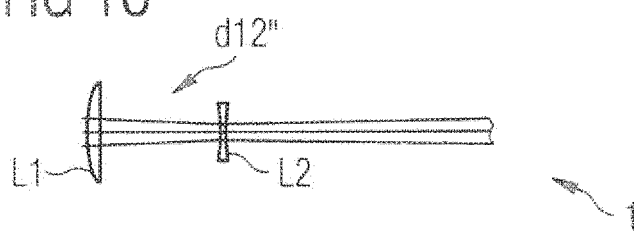

FIGS. 1B and 1C show that a smaller distance d12' increases the divergence and a larger distance d12" reduces the divergence (at least as long as the distance d12 is smaller than the distance between the converging lens L1 and the focus generated by the converging lens L1). This also changes the size of the beam at the converging lens L3 (e.g., the beam diameter based on the full width at half maximum (FWHM) of the intensity profile), whereby by shifting the converging lens L3 (i.e., changing the distance d23) the current size of the beam at the converging lens L3 can also be varied.

It can be seen that a (nominal) beam size at the second converging lens L3 can be achieved in a wide range in any number of different ways, e.g., with a small divergence and a large distance d23 (propagation length) or a large divergence and a small distance d23.

The second converging lens L3 changes the divergence of the beam once again. The influence of the second converging lens L3 on the divergence depends on the focal length of the second converging lens L3 and on the size of the beam 3 at the second converging lens L3. The larger the beam at the second converging lens L3 and the smaller the focal length f3, the greater the change in divergence that is caused. The size of the beam is not influenced by a single lens (here by the second converging lens L3).

As explained above, the (nominal) beam size can be achieved with different divergences. Then, if the focal length f3 is chosen reasonably, it is possible to let the beam hit the second converging lens L3 with such a divergence that the desired output divergence is achieved as the output beam parameter by the second converging lens L3. For a correspondingly continuous adaptation of the output beam parameters, FIG. 1A shows an arrow 5A for indicating the adaptability of the distance d12 between the first converging lens L1 and the diffusing lens L2 by the displaceability of the diffusing lens L2. Furthermore, FIG. 1A shows an arrow 5B for indicating the adjustability of the distance d23 between the second converging lens L3 and the diffusing lens L2 by the displaceability of the converging lens L3.

If only centered rotationally symmetrical lenses are used in the beam expander 1 and a beam path along the common axis of symmetry of the rotationally symmetrical lenses is assumed, rotationally symmetrical beam shaping takes place.

The beam adaptation device disclosed herein for variably adjusting astigmatism of an electromagnetic radiation propagating along a propagation direction is based on a combination of such a beam expander with the aspect of astigmatism generation when a beam passes through a tilted lens. The result is a variable beam expander that can independently change the size of the beam and the divergence in different transversal directions. The directions of the change in size and the change in divergence do not have to coincide; i.e., a general astigmatism can be generated, compensated, or arbitrarily influenced.

Figure 2:
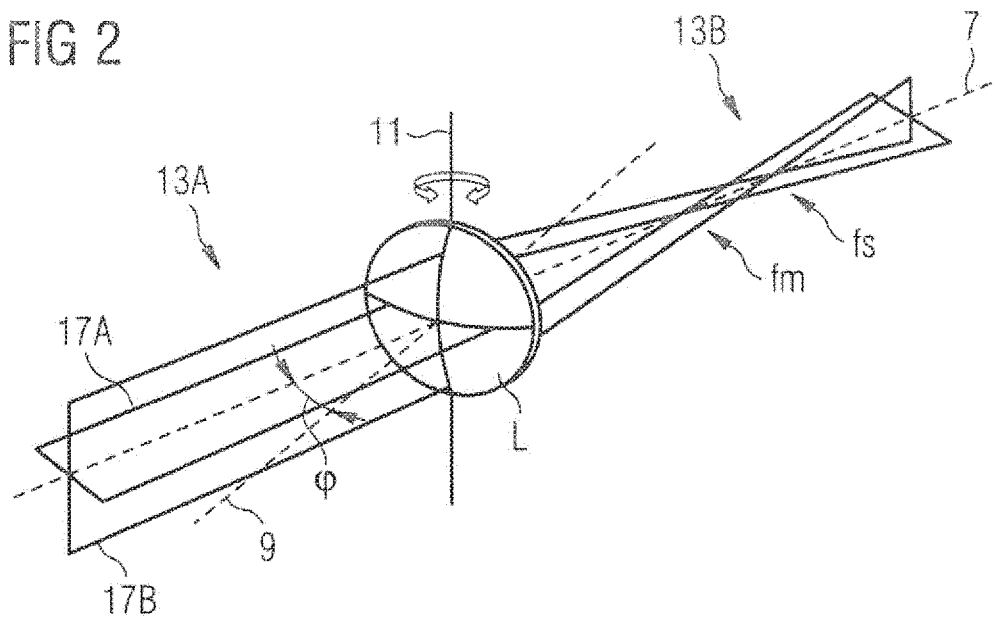
FIG. 2 shows a schematic perspective view of a beam passing through a tilted rotationally symmetrical lens.

FIG. 2 illustrates the influence of tilting a rotationally symmetrical lens L with respect to a beam axis 7 given by the propagation direction of the beam. The symmetry axis 9 of the lens L, which is also designated as the optical axis of a rotationally symmetrical lens, runs at an angle φ to the beam axis 7. In FIG. 2, the tilting takes place about a tilt axis 11, which runs perpendicularly to and through the beam axis 7.

For an incident beam 13A, the focal length of the lens L now depends on the orientation of the considered plane because the curvature of the lens is no longer rotationally symmetrical to the beam axis 7. In the meridional plane 17A, in which the beam axis 7 as well as the symmetry axis 9 of the lens lie and to which the tilt axis 11 extends orthogonally, there is a shortening of the focal length (focal length fm in FIG. 2) in comparison to the focal length in the sagittal plane 17B (focal length fs in FIG. 2). The sagittal plane 17B also contains the beam axis 7, but extends orthogonally to the meridional plane 17A and thus also contains the tilt axis 11. An astigmatism is given in the outgoing beam 13B.

In contrast to cylindrical optics (just fixed in the beam) or other non-rotationally symmetric optics fixed in position, the astigmatic effect of tilting rotationally symmetric optics can be continuously adjusted, for example, starting from a zero point (no tilting, identical focal lengths in all planes including the beam axis 7, i.e., no astigmatic effect).

With increasing tilt angle, additional higher order imaging errors, such as coma, can occur in addition to astigmatism, but these effects (especially in optics with small numerical apertures) can be at least partially neglected.

Figure 3:
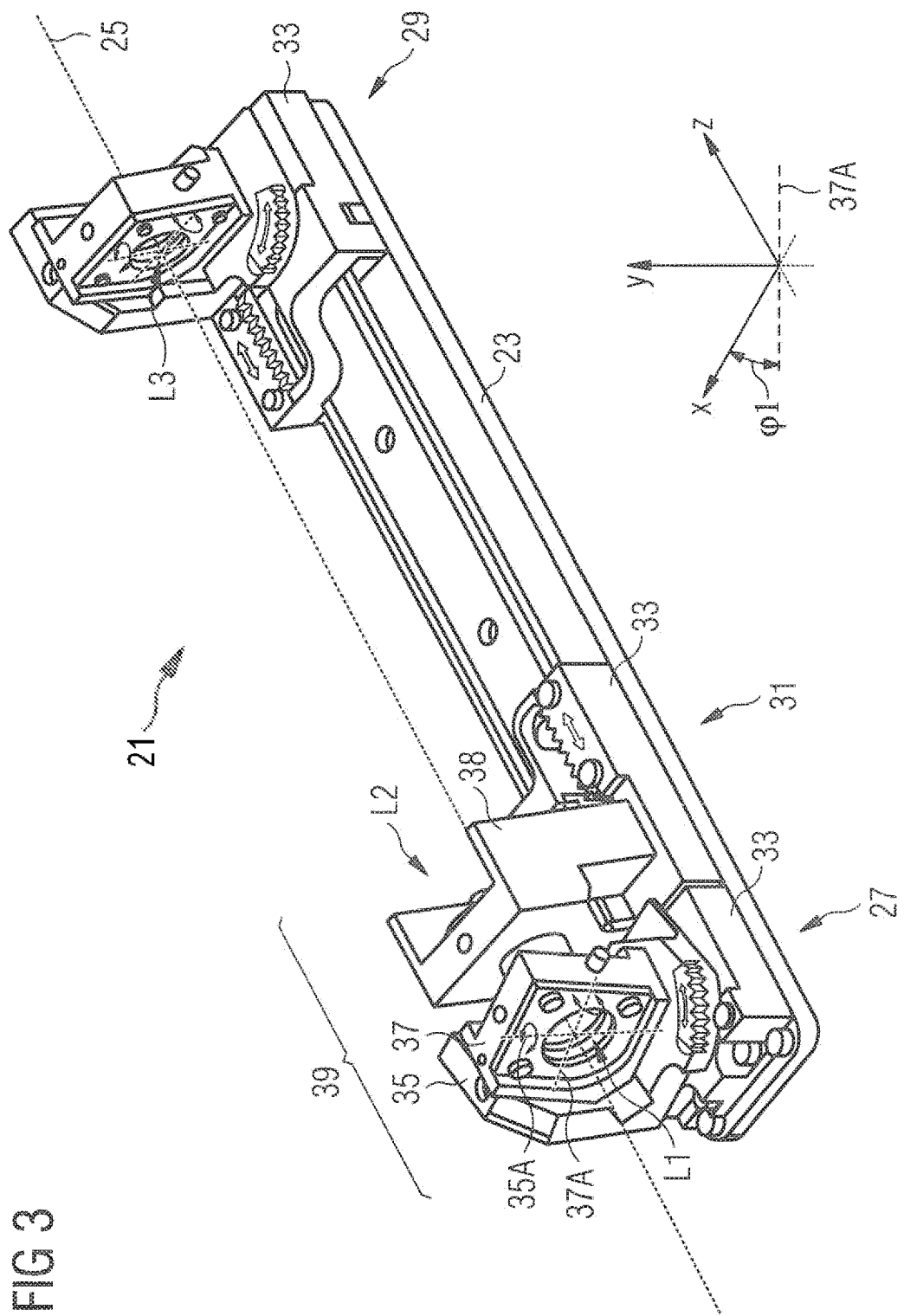
FIG. 3 shows an embodiment of a variable astigmatic beam adaptation device as described herein.

FIG. 3 shows an exemplary embodiment of a beam adaptation device 21 based on the classic variable beam expander 1. An adjustment rail 23 has a pair of rails extending along a beam axis 25 of the beam adaptation device 21 (given by the preferred propagation direction of an in-coupled laser beam). On the adjustment rail 23, there are arranged a first converging lens unit 27, a second converging lens unit 29, and a divergent lens unit 31 disposed between the first converging lens unit 27 and the second converging lens unit 29. At least two of the three units have a carriage 33, which engages in the adjustment rail 23. The converging lens units 27, 29 are examples for astigmatism lens units, which allow a local astigmatism setting as explained in FIG. 2 to be made, and thus influence an astigmatism and a non-rotationally symmetric lateral extent of a beam in the subsequent optical system. Furthermore, the diverging lens unit 31 is an example of a divergence adjustment lens unit. The divergence adjustment lens unit allows adjusting the divergence and thus influencing the divergence in a locally symmetrical manner. The divergence adjustment lens unit allows thus essentially only influencing the mean lateral extent and the mean lateral divergence in the subsequent optical system.

The first converging lens unit 27 is arranged at one end of the adjustment rail 23 and includes at least one first converging lens L1 that is tiltably mounted with respect to a plane extending orthogonally to the beam axis 25. This means that an optical axis (not explicitly shown) of the converging lens L1 can be tilted with respect to the beam axis 25 of the beam adaptation device 21. In this regard, FIG. 3 shows a first rotation holder 35, which is provided on the carriage 33 rotatable about a first tilt axis 35A. The first tilt axis 35A is perpendicular to a plane spanned by the pair of rails (here the x-z plane). The tilt axis 35A of the rotation holder 35 runs in particular through the beam axis 25 of the beam adaptation device 21 (as long as no translation transverse to the beam axis 25 is carried out).

Furthermore, there is a second rotation holder 37 attached to the first rotation holder 35 for receiving the converging lens L1 and for positioning the converging lens L1 in the beam axis 25. The second rotation holder 37 provides a second tilt axis 37A. The second tilt axis 37A extends perpendicularly to the first tilt axis 35A and runs in particular through the beam axis 25 of the beam adaptation device 21 (as long as no translation transverse to the beam axis 25 is carried out). For clarification, the orientation of the second tilt axis 37A is indicated in the coordinate system by an angle φ1 due to the tilting around the first tilt axis 35A.

In addition, the first converging lens unit 27 may have one or more translation units (not shown) for displacing the converging lens L1 transversely to the beam axis 25, being used for compensating for any deflections of the beam propagation direction away from the beam axis 25. In the exemplary embodiment of FIG. 3, the carriage 33 of the first converging lens unit 27 is removably affixed to the adjustment rail 23, for example.

As a result, the first rotation holder 35 and the second rotation holder 37 allow the converging lens L1 to be aligned in any desired direction by an adjustable angle φ tilted with respect to the beam axis 25.

The second converging lens unit 29 is arranged at the other end of the adjustment rail 23, whereby the second converging lens L3 is tiltably mounted around two axes analogous to the implementation of the first converging lens unit 27. It can also be seen that the position of the second converging lens unit 29 can be shifted and fixed locally along the rail pair, i.e., the beam axis 25, via the associated carriage.

The diverging lens unit 31 also includes a carriage 33 which can be moved along the pair of rails and which carries a holder 38 which positions the diverging lens L2, e.g., of short focal length, symmetrically to the beam axis 25.

The converging lens L1 of the first converging lens unit 27 and the divergent lens L2 of the divergent lens unit 31 act as optical input element 39 of the beam adaptation device 21, and the converging lens L3 of the second converging lens unit 29 represents the optical output element of the beam adaptation device 21.

Even if the embodiment described above is configured for beam expansion, the embodiments of the concepts disclosed herein can also result in a reduction of a beam dimension or a divergence and may also include optical systems that leave one or more characteristics of the beam unchanged.

Other embodiments of variable beam expanders with more than three lenses can also provide the required beam adjustment. All lenses or a portion of the lenses (for example, only a single lens if full freedom for alignment is not required) can be tiltably mounted.

Further, in contrast to a system for a fixed expansion, which is based, for example, on two lenses, a system with three or more lenses in the configuration disclosed herein (or in a similar configuration) may provide a tolerance range needed in terms of the characteristics of an output beam to cover a range of input beam characteristics to be received and to provide full freedom in continuously variable adjustment.

In the following, the effect of the beam adaptation device 21 is described for a round, anastigmatically collimated input beam, which features out-of-roundness and an astigmatism, for example. However, the functional principle can also be implemented for non-round, astigmatic (convergent or divergent) input beams, in which the roundness and astigmatism are changed, for example, the divergence is reduced to a minimum associated to the beam, and the beam is converted into a round anastigmatic beam, for example.

The shape of lenses used in the beam adaptation device 21 may be spherical or partially or wholly aspherical. The lenses can be flat on one side or curved on both sides. Furthermore, surface curvatures in the same or in opposite directions are possible, whereby the special shape of a lens can influence the effect of the desired astigmatism and the undesired higher order aberrations when tilting.

If the converging lens L1 is tilted, the lens combination L1, L2 is generally set to an astigmatically diverging effect. The mean divergence can be freely set by the distance between the lenses L1 and L2. The astigmatic difference can be adjusted by the effective tilt angle $\varphi$ resulting from the two tilt angles with respect to the tilting axes 35A, 37A. The orientation of the minimum divergence in the meridional plane and the maximum divergence in the sagittal plane can be selected by the azimuth angle of the tilt axis assigned to the effective tilt angle (in the x-y plane). If only one tilting is performed, e.g., around the tilt axis 35A or the tilt axis 37A, this tilt axis corresponds to the effective tilt axis, and the meridional and sagittal planes are defined by this tilt axis. The tilting can also be generated, for example, with appropriate rotation holders, with which the tilt axis can be rotated in the x-y plane around the beam axis.

In summary, the beam expands after the lens combination L1, L2, i.e., the optical input element 39, according to the set non-rotationally symmetric divergence, and obtains an elliptical profile.

The converging lens L3 is now also tilted by an angle around an effective tilt axis in the x-y plane. The lateral extent of the beam at the location of the converging lens L3 is not influenced by the converging lens L3. The astigmatic effect of the converging lens L3 can be described as that of the converging lens L1, but with its own meridional and sagittal planes. The combination of the astigmatism of the beam generated by the optical input element 39 and the astigmatism generated by the converging lens L3 makes it possible to generate a general astigmatism of the output beam that can be freely parameterized in a wide range.

For example, the converging lens L3 can be tilted in such a way that the direction-dependent different divergence caused by the lenses L1 and L2 is compensated for, and a beam with non-rotationally symmetrical lateral extent and equal divergence in all directions or, for example, with direction-dependent minimum possible divergence, is generated.

As a real (thick) lens typically causes a beam offset when being tilted, the tiltability of a lens can be supplemented by a displacability of the lens perpendicular to the beam axis 25 of the system, as mentioned above.

Of course, the use of degrees of freedom in the system can be dispensed with if the aim is only to partially influence the beam. In particular, the tilting of only one lens is much easier to adjust than that of several lenses.

In an exemplary embodiment, each of the first converging lens L1 and the second converging lens L3 is a plano-convex lens and the diffusing lens is a biconcave lens. As in the example in FIG. 3, the diverging lens L2, for example, has no degrees of freedom for tilting. The transversal positions along the beam axis 25 (z positions) of the diverging lens L2 and the second converging lens L3 can, for example, be finely adjusted using a dovetail guide.

Besides the explicitly explained embodiment with a converging lens at the entrance and exit and a diffusing lens arranged in between, the first two lenses can be diffusing lenses and the last lens can be configured as a converging lens. Furthermore, one can use in the beam adaptation device one diffusing lens at the entrance and one at the exit, and a converging lens can be arranged in between. Furthermore, one can use in the beam adaptation device a converging lens at the entrance and at the exit, and a diverging lens can be arranged in between.

If required, the degrees of freedom can generally be finely adjusted using gear racks and gear wrenches, threads, or lever tools. After adjustment, the position of the degrees of freedom can also be individually fixed with, e.g., fixing screws. x-y translations, which can be adjusted via fine-thread pins, can, for example, alternatively be held precisely in position via counter springs.

In some embodiments, for example, one tilt axis can be provided for each (converging) lens, whereby the orientation of the tilt axis can be rotatable around the beam axis 25 (z axis). In contrast to the converging lens units 27, 29 in FIG. 3, a converging lens unit can include, instead of the first rotation holder, e.g., a rotation device, which makes the orientation around the beam axis 25 for the tilt axis of the second rotation holder in the x-y plane freely selectable. Thereby, desired orientations can be set, whereby the tilt angle of the second rotation holder is the effective tilt angle, and the tilt axis is the same as the effective tilt axis. In some embodiments, lenses can also be positioned in tube systems, whereby a z position can be adjusted, for example, by means of a thread or worm gear adjuster. It is important for the different embodiments that the direction of the symmetry axis of the lenses to be tilted, i.e., the direction of the optical axis 9 of the lens in FIG. 2, can be freely set.

In general, for the analysis of the beam after the variable astigmatic beam adapter various analytical methods can be used to provide information on divergence and beam size. Known methods for beam diameter determination and beam divergence determination include in particular the methods mentioned in ISO 11146. Furthermore, the use of wavefront sensors such as a Hartmann sensor or a Shack-Hartmann sensor is also possible. Different methods can also be combined with each other. In general, it is preferable to use methods that allow a quick characterization of the beam properties at the reference plane and thus display the effect of the adjustment of the variable astigmatic beam adapter directly in real time.

As any further optics in a subsequent optical system can influence both the size and the divergence of the beam, intuitive and simple adjustment of the system in just a few steps is not always possible.

However, the beam analysis can simplify the alignment process if the reference plane of the analysis is directly on the last lens. If the beam is characterized with reference to the position on the last lens (for example, the converging lens L3 of the beam adaptation device 21 of FIG. 3), this last lens has no or only a very small influence on the beam size at this reference plane, but only or mainly an influence on the divergence of the beam. The previous degrees of freedom of adjustment of the beam adapter, for example, those of the lens combination 39, can be used in an approximate manner to adjust the output size of the beam at the reference plane without considering the output divergence. With the degrees of freedom of the last lens, the output divergence can be adjusted, approximately without influencing the size. As far as these statements are valid only approximately, a fast converging iterative procedure for the adjustment of the degrees of freedom can be applied, which, unlike with freely chosen reference planes, converges safely and fast. This also works if the reference plane is not located directly on the last lens, but downstream at a small distance (in comparison to the quotient beam diameter and divergence).

If the beam at a preferred reference plane is not directly accessible for characterization, a suitable imaging technique can be used to image the plane at a desired location. It is generally possible to characterize the beam in a sufficient manner at another position and to calculate the properties at the preferred reference plane.

Figure 4:
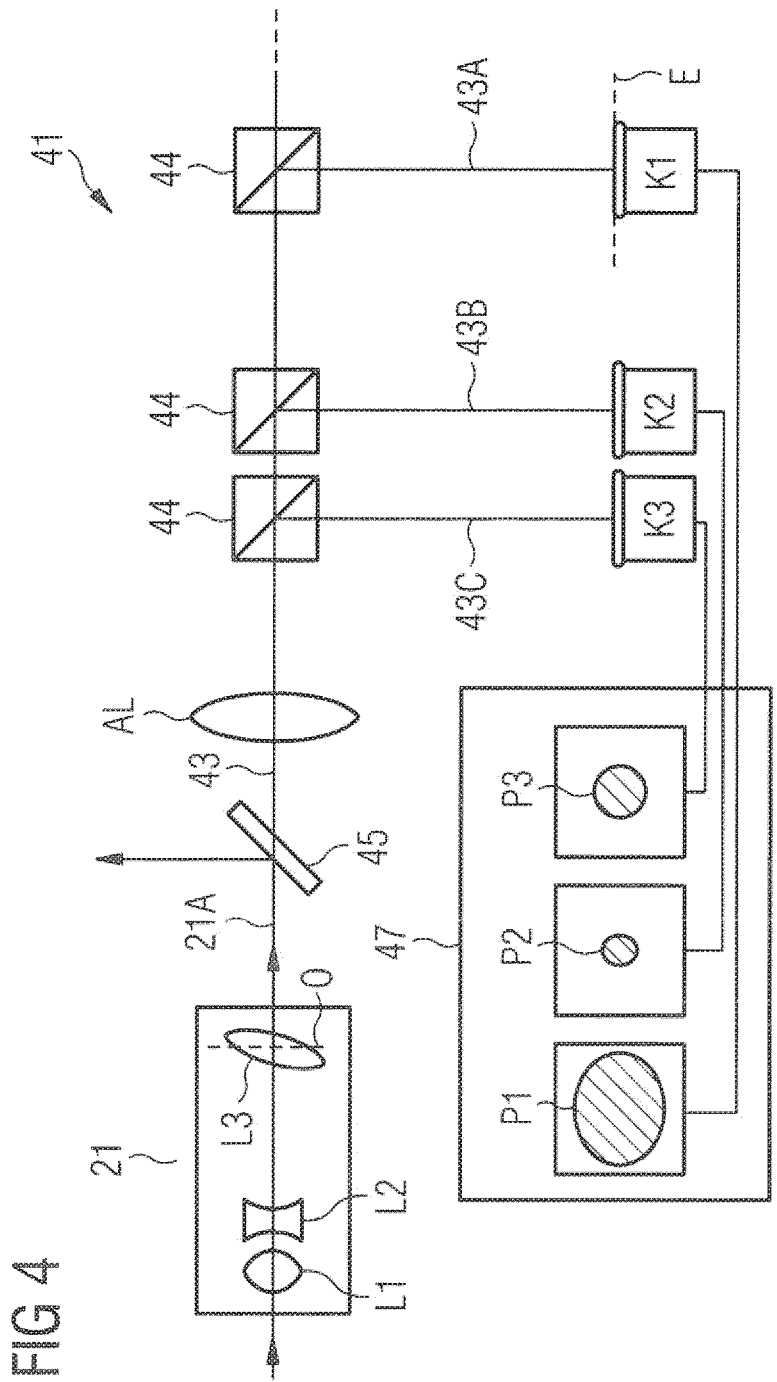
FIG. 4 shows an embodiment of a beam analysis unit for analyzing an output beam of a variable astigmatic beam adaptation as described herein.

FIG. 4 shows an exemplary embodiment of a beam analysis unit 41 for characterizing an output beam 21A of the beam adaptation device 21, which can be used in particular for adjusting the beam adaptation device.

A portion 43 of the output beam 21A (e.g., light leaking through a deflecting mirror 45 acting as an attenuator) is used for analyzing the beam and is directed through an analysis lens AL. After the analysis lens AL, the portion 43 of the beam is further divided into partial beams, e.g., with beam splitters 44.

A first partial beam 43A is used to generate an image of a beam profile P1 at the exit of the beam adaptation device 21 (for example, based on an object plane O selected to be at the position of the second converging lens L3) on an image plane E of the camera K1 through the analysis lens AL. The image of the beam profile P1 on the camera K1 depends only on the size of the output beam 21A at the exit of the beam adaptation device 21 (e.g., at the second converging lens L3) and does not depend on the divergence. The effect of the second converging lens L3 on the divergence is not detected in this way. Thus, the first two lenses L1, L2 of the beam adaptation device 21 can be used to adjust the beam size, for example, by displaying the beam profile P1 on a beam profile monitor 47.

A further partial beam 43B is used to generate a far field image of the output beam on a camera K2, i.e., the camera K2 is located exactly in the focal plane of the analysis lens AL (but not necessarily in the focus of the beam). The image of the beam profile P2 captured by the camera K2 only depends on the divergence of the output beam 21A, not on the size of the output beam 21A at any real finite position. Therefore, the image from camera K2 can be used to adjust the divergence of the output beam 21A via one or both of the position and the angle of the second converging lens L3.

In some parameter ranges, the method described above may not be unambiguous, for example, if the output beam 21A is not collimated in front of the analysis lens AL. This is because in general the output beam 21A may be convergent or divergent after the beam adaptation device 21. In some embodiments of the analysis unit 41, a further partial beam 43C can be measured with a further camera K3 with regard to a suitable position along the propagation direction in order to enable an unambiguous characterization of the beam. Further observation points in the beam may be useful to reduce the susceptibility of the method to measurement errors when applied. This means that additional detection units can be optionally provided in front of camera K2, between camera K1 and camera K2, or behind camera K1 for recording additional field planes.

In some embodiments of the analysis unit 41, all or some portion of the beam positions or images, which are to be analyzed, can be projected onto a single camera chip displayed together, or both on the beam profile monitor 47, and can be evaluated with a corresponding computer-based analysis. Furthermore, instead of being split after the analysis lens AL, the (attenuated) output beam 21A can be split in order to analyze these portions with several adapted lenses or with other measuring devices.

Furthermore, a Shack-Hartmann sensor at the beam exit, e.g., behind the last lens L3, can be used to determine both the profile and the divergence of the output beam 21A at this point. Here, too, a reference plane can be mapped onto the sensor, whereby the use of a relay optic (e.g., an f-2f-f system) can be useful, which by itself does not add any wavefront curvature.

With reference to the application in frequency conversion, the aspects described herein are also partly based on the realization that if, before the frequency conversion (or between frequency conversion stages in the, e.g., infrared or visible frequency range), a counter-directional deformation of phase, amplitude, or both is imprinted onto the beam, an improved beam profile of the frequency-converted beam can be generated after superimposing the deformations with the aberration caused in the frequency converter.

As mentioned above, the generation of UV laser radiation by non-linear frequency conversion from, e.g., an infrared laser beam can lead to undesired aberrations in the amplitude and phase of the generated UV laser radiation. Such aberrations can be caused, for example, by the so-called "walk-off effect," by facets of the non-linear crystal or the non-linear crystals tilted with regard to the beam, generally by crystal defects or surface shape defects. The latter may be caused by the anisotropy of the crystals or by manufacturing processes and may be undesirable and not always completely reproducible. Aberrations may also be caused by other, possibly also still unknown effects or by various (general or faulty) effects within auxiliary or subsequent optics of the frequency conversion, such as in optics for separating the harmonics.

With the aim to keep such aberrations as low as possible and to avoid the use of additional optics (damageable due to UV radiation), if possible, for the subsequent correction of the aberrations, it is proposed herein to imprint the laser beam with a suitable, in particular adjustable, spatial phase and amplitude adaptation before the frequency conversion. Thereby the spatial phase and amplitude adaptation are superimposed with the aberrations in the conversion crystal and/or by any potentially not avoidable subsequent optics in such a way that (almost) the desired beam properties are given again at the exit of the entire system. This precompensation allows keeping the number of optics exposed to UV-induced destruction at a small number.

The beam adaptation device described herein can be used to provide one or more output beams for frequency conversion which compensate for the aberration-causing property of the conversion crystal, e.g., during the generation of the third harmonic (THG) in the UV, or also during the generation of UV radiation by the $2^{nd}$ or $4^{th}$ harmonic (SHG, FHG), generally during the generation of higher harmonics. Precompensation with the beam adaptation device refers in particular to a non-rotationally symmetrical beam shape when entering the conversion crystal, as explained in the following in connection with FIGS. 5 to 7.

In addition to the explicitly mentioned generation of UV radiation, the beam adapter can also be used before a SHG or another frequency conversion with target wavelengths below 550 nm, for example, because it can also be advantageous in this wavelength range to use as few optics as possible subject to high power. For example, many optical materials and coatings in this wavelength range can no longer be used in a high-power laser beam because they begin to absorb and build up thermal lenses. Furthermore, e.g., gaseous contaminations in the ambient air can be deposited on optics already by light in the range of 550 nm and less. Thus, it is advantageous to reduce the number of optics from the area of the short-wave light given behind a frequency conversion. This can be made possible, for example, by beam adaptation in the beam adaptation device before frequency conversion.

Advantages of a pre-compensation of aberrations imprinted downstream with the beam adaptation device can also be given for lasers with longer wavelengths, e.g., infrared (IR) lasers, if it is not possible to subsequently compensate or avoid aberrations, or to do so well, e.g., due to poor accessibility, which is given, e.g., due to piping or encapsulation at these positions.

Figure 5:
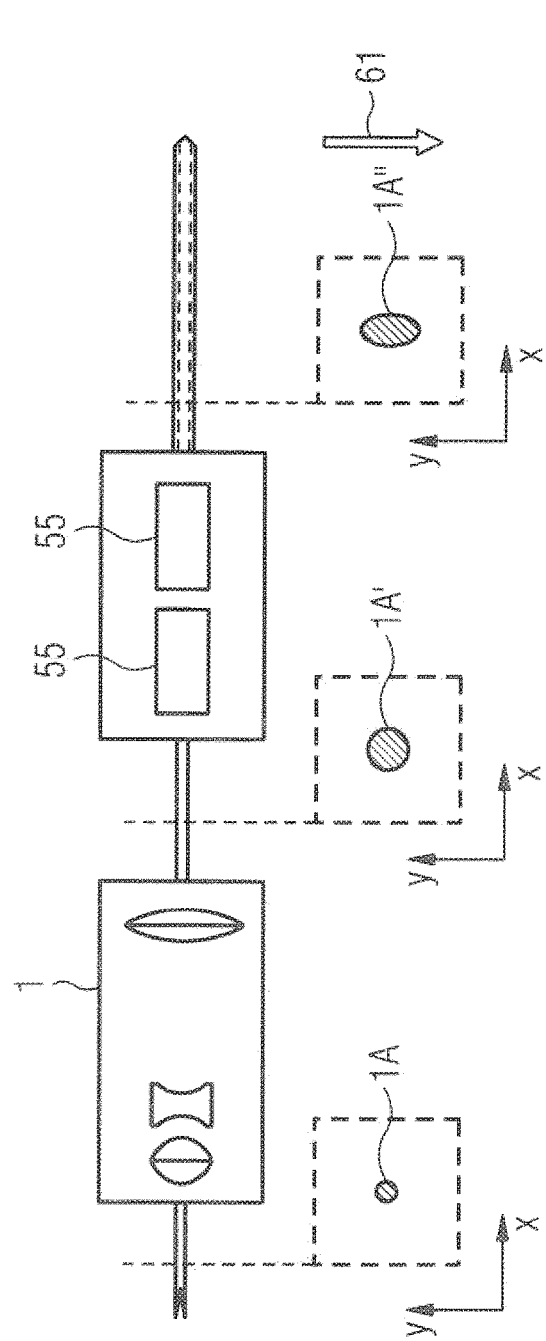
FIG. 5 shows a schematic illustration of non-pre-compensated frequency conversion effects.

The aforementioned walk-off effect may be present in a conversion crystal. The walk-off effect results in one of the wavelengths required for the non-linear process not propagating in exactly the same direction as the other. This can form a noncircular frequency-converted beam. FIG. 5 illustrates this for the set-up of a frequency conversion unit with a conventional beam expander (see, e.g., beam expander 1 shown in FIG. 1). The conventional beam expander converts an input laser beam with a symmetrical beam profile 1A into a correspondingly larger symmetrical beam profile 1A'. By the frequency conversion, e.g., UV radiation is generated in an arrangement of one or more non-linear crystals 55 in an area, which is elongated in direction 61, for example, due to the walk-off and accordingly has a non-rotationally symmetrical, non-circular beam profile 1A". Examples of frequency conversion crystals include beta-barium borate (beta-BaB$_2$O$_4$, BBO), lithium triborate (LiB$_3$O$_5$, LBO), cesium lithium borate (CsLiB$_6$O$_{10}$, CLBO), and potassium dihydrogen phosphate (KH$_2$PO$_4$, KDP).

When using a beam adaptation device 21 for a variable adjustment of astigmatism, this out-of-roundness can be compensated by a corresponding counter-directional out-of-roundness of the beam underlying the frequency conversion (e.g., the output beam of the beam adaptation device) given in or near the crystal.

Figure 6:
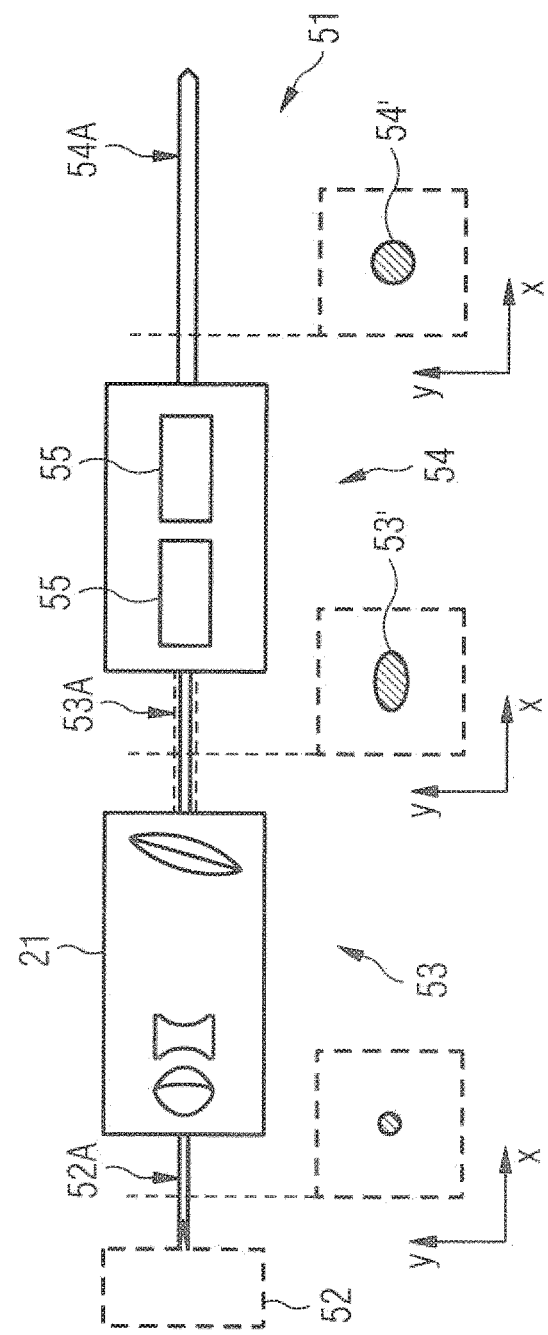
FIG. 6 shows an embodiment of an example of a frequency conversion unit with a variable astigmatic beam adaptation device for pre-compensation of the beam shape, as described herein.

FIG. 6 shows a frequency conversion unit 51 with a beam pre-compensation device 53 and an arrangement 54 of one or more conversion crystals 55. FIG. 6 additionally shows three beam profiles as they form on the beam axis.

The frequency conversion is based on a beam source 52. This is, for example, a Yb:YAG laser, Yb:glass laser, Nd:YAG laser, Nd:YVO laser, Nd:glass laser, or Nd:YLF laser or another solid state or fiber laser with, e.g., the laser-active ions ytterbium or neodymium in a host material. The beam source 52 can also be a solid-state or fiber laser with other laser-active materials or other host materials or a diode laser or a gas laser. In general, the beam source 52 can be a laser beam source that emits an electromagnetic radiation 52A, i.e., laser radiation in the wavelength range from, e.g., 500 nm to, e.g., 1600 nm, in particular from 800 nm to 1100 nm, furthermore in particular one or more of the wavelengths of 1030 nm, 1047 nm, 1051 nm, 1064 nm, 1070 nm, and 1080 nm. The electromagnetic radiation 52A is provided as input radiation for the beam pre-compensation device 53, in particular for its beam adaptation device 21 for a variable adjustment of astigmatism. FIG. 6 shows an exemplary symmetrical beam profile 1A of this primary radiation.

The beam adaptation apparatus 21 is set such that an output beam 53A of the beam pre-compensation apparatus 53 has predetermined beam parameters that result in a one-sided enlarged beam shape in or near one of the frequency conversion crystals 55. A correspondingly non-circular (e.g., elliptical) beam profile 53' is indicated in FIG. 6 as an example at the exit of the beam adaptation device 21.

Figure 7:
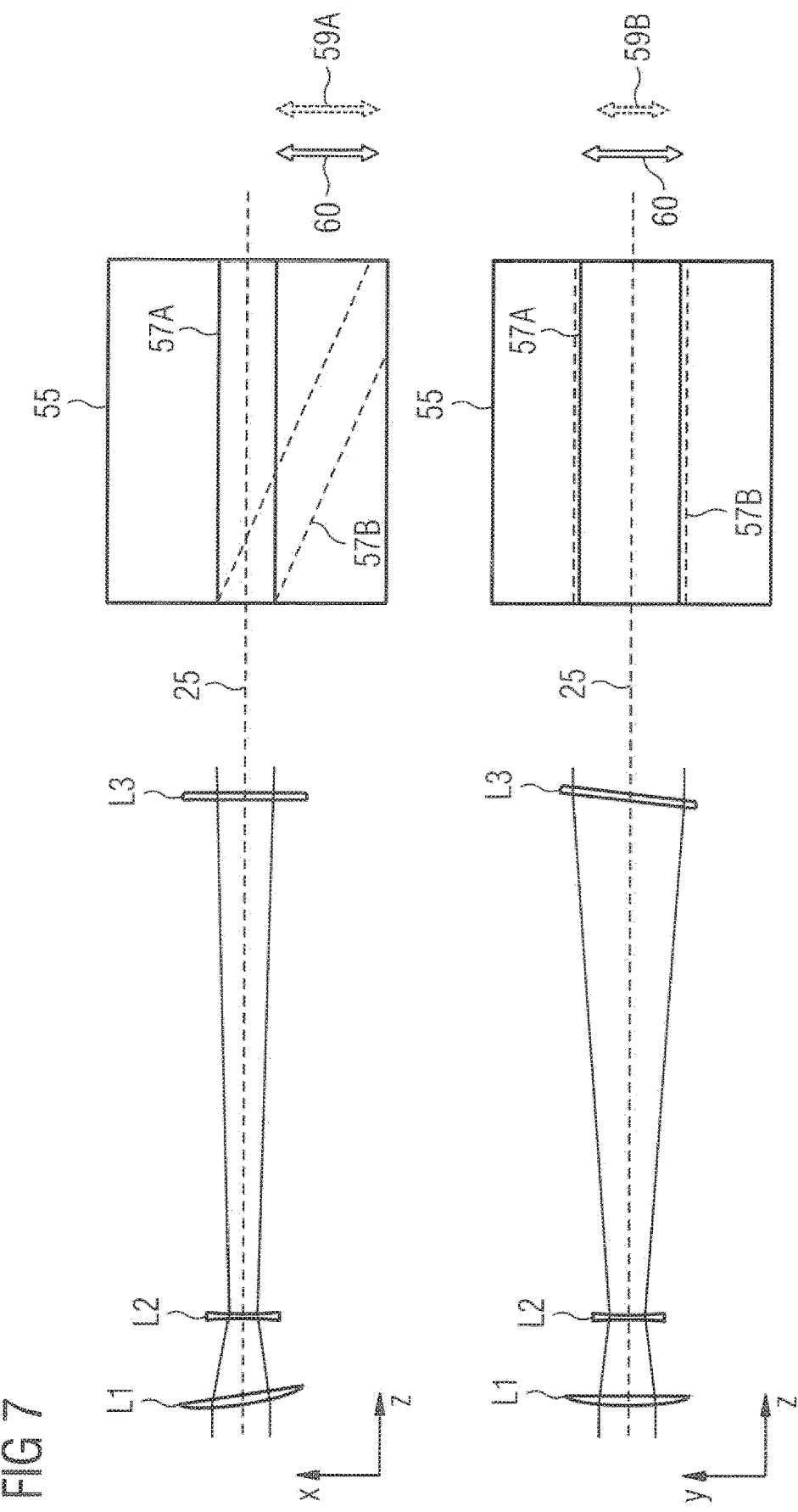
FIG. 7 shows schematic horizontal and vertical cut views of a frequency conversion unit to illustrate the pre-compensation described herein.

FIG. 7 illustrates an exemplary setting of the beam adaptation device 21 in two orthogonal planes, the x-z (horizontal) plane and the y-z (vertical) plane, as well as an exemplary orientation of a conversion crystal 55, which leads to a walk-off in the x-z plane in the "–x" direction for the wavelength subject to the walk-off.

FIG. 7 shows the beam path of the unaffected wavelength in the conversion crystal 55 with a solid line pair 57A and the beam path of the affected wavelength with a dotted line pair 57B. The latter runs in the horizontal plane at a walk-off angle with respect to the beam axis 25. There is no walk-off effect in the y-z direction and the beam paths (dotted/solid line pairs 57A, 57B) extend accordingly parallel in the y-z plane.

Without an appropriate beam adaptation device, this can lead to a widening of the generated UV radiation in the horizontal plane, as shown in FIG. 5. This is illustrated in FIG. 7 by dotted arrows 59A, 59B that differ in length and indicate the beam diameters (see also the frequency-converted radiation shown in FIG. 5 by a dotted and a solid line).

As further shown in FIG. 7, the beam adaptation device 21 adapts the beam parameters of the output beam 53A in such a way that the output beam 53A is larger in the y direction than in the x direction while having essentially, for example, the same divergence. The adjustment of the beam size can at least partially balance the different beam diameters in the two directions of the generated UV radiation 54A. This is illustrated in FIG. 7 by arrows 60, which are of the same length and indicate the beam diameters in the planes. It is illustrated in FIG. 6 by a round beam profile 54' after the frequency conversion unit 51.

In other words, the frequency conversion method proposed herein defines the output beam 53A by a variable astigmatic beam adaptation device to be smaller in the horizontal direction (i.e., in the walk-off direction) than in the vertical direction, so that the walk-off effect is pre-compensated. After the conversion, one then obtains an essentially round frequency-converted beam 54A.

For the pre-compensation, the first converging lens L1 may be tilted about the vertical axis and the second converging lens L3 may be tilted about the horizontal axis, as shown in FIG. 7. The distances of the lenses L1, L2, and L3 have also been adapted such that an output beam 53A is formed having the desired divergence in the respective planes.

Walk-off is always the same for a given crystal orientation and length, so that one could select, for compensating the walk-off, respective fixed optics that do not allow forming the beam in an adjustable way. However, the use of a variable astigmatic beam adaptation device has the advantage that a fine adjustment of the pre-compensation can be performed in the respective frequency conversion mechanism, if the actual source and strength of the astigmatism and the out-of-roundness cannot be predicted exactly due to the superposition of further different aberration causes (see above) or aberration sources (including a possibly not predictable astigmatic non-circular source 52A).

For example, imperfections of the conversion crystals or subsequent optics may affect the required pre-compensation. For example, the optical surface of the crystals may have a light cylinder due to polishing or there may be an effecting anisotropy of the crystal or the crystals. In particular due to the large number of parameters (known and unknown), the use of a beam adaptation device for variable beam shaping is useful because the beam parameters can be easily adapted from laser system to laser system to the special conditions.

This would not be possible with a cylindrical lens or a single tilted lens. Even two tilted lenses can offer still too little flexibility, because then the difference between the two axes may be variably adjustable, but the mean magnification of the beam cannot. In addition, the mean magnification changes compared to the set-up with lenses placed straight into the beam.

Besides the exemplary arrangement of a beam pre-compensation device in front of the arrangement of conversion crystals shown in FIG. 6, additionally or alternatively, a further beam pre-compensation device can be provided before one or before several specific conversion crystals or before each individual conversion crystal.

The example given for the use of a beam adaptation device in frequency conversion shows that beam adaptation devices can generally be used in optical systems whenever a high degree of flexibility with regard to continuously variable adaptation of the laser beam is needed for a wide variety of reasons (e.g., exchange of components having non-identical properties, poor access possibilities, e.g., due to covered or piped systems, operating parameter-dependent influence on beam parameters, etc.).

The beam adaptation device disclosed herein makes it possible with simple means to provide the respectively desired output parameter of a laser beam for a plurality of input parameters. Accordingly, optical influences of various components in optical systems can be flexibly compensated with the beam adaptation devices disclosed herein.

This means that the concept of pre-compensation can generally also be applied to non-UV systems if, for example, subsequent correction is not possible or difficult to achieve for other reasons (e.g., accessibility).

Figure 8:
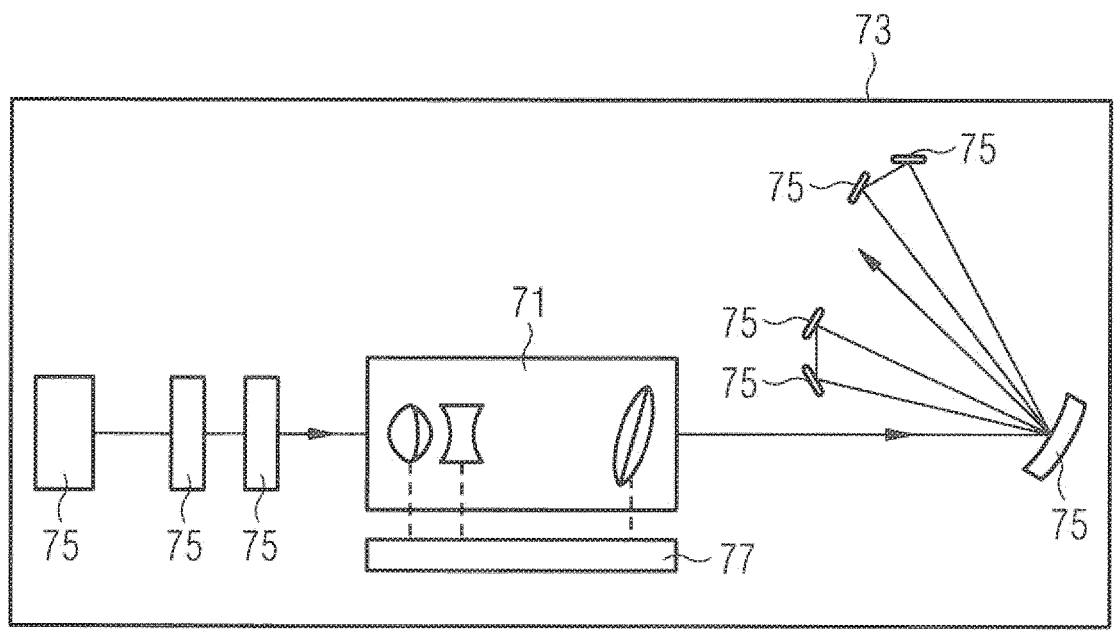
FIG. 8 shows a schematic of an example of an optical system with a beam adaptation device as described herein.

FIG. 8 generally shows a beam adaptation device 71, which is used in an optical system 73, e.g., to compensate for differences between exchangeable optical components 75 (laser sources, lenses, mirrors, laser media, pump sources) or to set certain application-specific output beam parameters. For example, a control unit 77 allows the setting of distance parameters, angle parameters, or both with respect to the lenses of the beam adaptation device 71.

Looking at the general use of the beam adaptation device, the wavelength range also extends to shorter and longer wavelengths with respect to the exemplary wavelengths given above. Thus, for example, ZnSe lenses can also be used for $CO_2$ lasers to enable the beam adaptation device to be configured in the corresponding wavelength range of the $CO_2$ laser.

For example, the beam adaptation device can be used in processing optics for beam tools that need to generate a round spot of defined size at a defined position after the processing optics in a reproducible manner. Such processing optics require an anastigmatic and round input beam of defined size and divergence, which can be provided by the beam adaptation device. Furthermore, diffractive optical elements (DOEs), for example, can benefit from input beams having reproducibly adjustable, precisely defined, and narrow-tolerant beam parameters.

OTHER EMBODIMENTS

It is explicitly stated that all features disclosed in the description, the claims, or both are intended to be disclosed separately and independently from each other for the purpose of original disclosure as well as for the purpose of restricting the claimed invention independent of the composition of the features in the embodiments, the claims, or both. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A beam adaptation device for continuously variable adaptation of electromagnetic radiation propagating along a beam axis of the beam adaptation device with respect to beam parameters, comprising:
   a first astigmatism lens unit for receiving the electromagnetic radiation, wherein the first astigmatism lens unit comprises a first lens arranged to tilt with respect to the beam axis, for adjustment of astigmatism;
   a divergence matching lens unit comprising a second lens for adjusting the divergence, wherein the distance between the second lens and the first lens of the first astigmatism lens unit is adjustable along the beam axis; and
   a second astigmatism lens unit comprising a third lens arranged to tilt relative to the beam axis for adjustment of astigmatism, wherein the distance between the second lens of the divergence matching lens unit and the third lens is adjustable along the beam axis.

2. The beam adaptation device of claim 1, further comprising:
   an optical input element comprising the first astigmatism lens unit and the divergence matching lens unit; and
   an optical output element comprising the second astigmatism lens unit.

3. The beam adaptation device of claim 1, wherein:
   (a) one or both of the first lens and the third lens is a converging lens,
   (b) the second lens is a diverging lens, or
   (c) both (a) and (b).

4. The beam adaptation device of claim 1, wherein:
   (a) one or both of the first lens and the third lens is a diverging lens,
   (b) the second lens is a converging lens, or
   (c) both (a) and (b).

5. The beam adaptation device of claim 1, wherein:
   (a) one or both of the first lens and the second lens is a diverging lens,
   (b) the third lens is a converging lens, or
   (c) both (a) and (b).

6. The beam adaptation device of claim 1, wherein:
   (a) one or more of the first lens, the second lens, and the third lens is a rotationally symmetrical lens,
   (b) one or both of the first lens and the third lens is displaceable in at least one direction orthogonal to the beam axis, or
   (c) both (a) and (b).

7. The beam adaptation device of claim 1, wherein one or more of the first astigmatism lens unit, the divergence matching lens unit, and the second astigmatism lens unit is configured such that:
the tiltability of one or both of the first lens and the third lens, and
the displaceability of one or both of the second lens and the third lens by tilting and displacing of the corresponding lenses,
allows setting the magnitude of the electromagnetic radiation at a reference plane downstream of the beam adaptation device and the divergence of the electromagnetic radiation in respectively two independent directions.

8. The beam adaptation device of claim 1, further comprising:
(a) an adjustment rail formed along the beam axis, wherein the adjustment rail is configured to position one or more of the first astigmatism lens unit, the second astigmatism lens unit, and the divergence matching lens unit along the beam axis;
(b) at least one rotation holder configured to hold the first lens or the third lens, wherein the at least one rotation holder has at least one adjusting device for adjusting at least one tilt angle of the lens about at least one tilt axis that extends orthogonally to the beam axis; or
(c) both (a) and (b).

9. The beam adaptation device of claim 1, further comprising:
a beam analysis unit comprising:
a first detection unit for recording a beam profile of the electromagnetic radiation in an image plane;
an analysis lens, which maps the beam profile in a region of the second astigmatism lens unit onto the image plane; and
at least one far field detection unit for recording a beam profile of the electromagnetic radiation in the far field after the second astigmatism lens unit,
wherein the beam analysis unit is configured to analyze an analysis portion of the electromagnetic radiation.

10. The beam adaptation device of claim 9, further comprising a control unit for:
(a) controlling the tilt of one or both of the first lens and the third lens,
(b) controlling one or more of the distances between the lenses as a function of at least one of a beam profile detected by the beam analysis unit, a predetermined target beam profile, and a measurement parameter derived from the beam, or
(c) both (a) and (b).

11. A frequency conversion unit comprising:
a beam pre-compensation device comprising a beam adaptation device according to claim 1 for shaping the electromagnetic radiation provided by a beam source into an output beam having predetermined beam parameters; and
a frequency conversion device comprising at least one frequency conversion crystal for generating a frequency-converted beam with the output beam, wherein the frequency conversion device is configured such that the frequency-converted beam is not generated in a rotationally symmetrically deformed manner with respect to one or both of the beam shape and divergence of the output beam.

12. The frequency conversion unit of claim 11, wherein:
(a) the frequency conversion device is adapted to generate the frequency-converted beam by a frequency conversion mechanism creating a non-rotationally symmetrical beam shape,
(b) the predetermined beam parameters are predetermined with respect to a non-rotationally symmetrical deformation of the beam and in particular for forming an asymmetric beam shape of the output beam in the frequency conversion crystal,
(c) the frequency conversion device at least partially compensates for the asymmetry in the frequency-converted beam with respect to one or both of beam shape and divergence,
(d) the frequency conversion device comprises a frequency conversion mechanism which, for correspondingly predetermined beam parameters of the output beam, generates a substantially rotationally symmetrical, frequency-converted beam with respect to one or both of beam shape and divergence, or
(e) two or more of (a) through (d).

13. The frequency conversion unit of claim 11, wherein:
the frequency conversion crystal is characterized by a walk-off direction given for the frequency conversion with respect to the propagation direction of the output beam,
the frequency conversion mechanism results in an enlarged beam shape of the frequency-converted beam in the walk-off direction, and
the beam pre-compensation device provides such predetermined beam parameters of the output beam that the beam shape of the output beam in or near the frequency conversion crystal perpendicular to the walk-off direction and to the propagation direction is larger than in the walk-off direction.

14. An optical system comprising:
a plurality of optical components influencing one or both of beam shape and divergence in the optical system; and
a beam adaptation device according to claim 1 for compensating one or both of beam shape and divergence in the optical system.

15. The optical system of claim 14, further comprising:
a control unit for adjusting one or both of a distance parameter and an angle parameter with respect to lenses of the beam adaptation device.

16. A frequency conversion method comprising:
providing electromagnetic radiation propagating along a propagation direction;
adapting the electromagnetic radiation with respect to beam size and divergence to form an output beam for a frequency conversion in at least one frequency conversion crystal; and
generating a frequency-converted beam in the frequency-conversion crystal,
wherein the frequency conversion is characterized by a walk-off direction given for the frequency conversion with respect to the propagation direction of the output beam, and
wherein the adjustment of the output beam causes the beam shape of the output beam in or near the frequency conversion crystal perpendicular to the walk-off direction and to the propagation direction to be larger than in the walk-off direction.

17. The method of claim 16, wherein the adjustment results in substantially rotational symmetry of the frequency-converted beam.

18. The method of claim 16, wherein:
the electromagnetic radiation is laser radiation in the wavelength range from about 500 nm to about 1600 nm, and
the frequency-converted beam is in the wavelength range from about 250 nm to about 600 nm, and the frequency-converted beam is harmonic radiation of second, third, or higher order of the electromagnetic radiation.

19. The method of claim 16, wherein adapting the electromagnetic radiation comprises adapting the electromagnetic radiation with a beam adaptation device comprising:
a first astigmatism lens unit for receiving the electromagnetic radiation, wherein the first astigmatism lens unit comprises a first lens arranged to tilt with respect to the beam axis, for adjustment of astigmatism;
a divergence matching lens unit comprising a second lens for adjusting the divergence, wherein the distance between the second lens and the first lens of the first astigmatism lens unit is adjustable along the beam axis; and
a second astigmatism lens unit comprising a third lens arrange to tilt relative to the beam axis, for adjustment of astigmatism, wherein the distance between the second lens of the divergence matching lens unit and the third lens is adjustable along the beam axis.

20. A frequency conversion method comprising:
providing electromagnetic radiation propagating along a propagation direction;
adapting the electromagnetic radiation with respect to beam size and divergence to form an output beam for a frequency conversion in at least one frequency conversion crystal; and
generating a frequency-converted beam in the frequency-conversion crystal,
wherein adapting the electromagnetic radiation comprises adapting the electromagnetic radiation with a beam adaptation device comprising:
a first astigmatism lens unit for receiving the electromagnetic radiation, wherein the first astigmatism lens unit comprises a first lens arranged to tilt with respect to the beam axis, for adjustment of astigmatism;
a divergence matching lens unit comprising a second lens for adjusting the divergence, wherein the distance between the second lens and the first lens of the first astigmatism lens unit is adjustable along the beam axis; and
a second astigmatism lens unit comprising a third lens arrange to tilt relative to the beam axis, for adjustment of astigmatism, wherein the distance between the second lens of the divergence matching lens unit and the third lens is adjustable along the beam axis.

* * * * *